(12) United States Patent
Pourjavid

(10) Patent No.: US 6,415,063 B1
(45) Date of Patent: Jul. 2, 2002

(54) METHOD AND APPARATUS FOR DEFECTIVE PIXEL IDENTIFICATION

(75) Inventor: Sussan Pourjavid, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/703,156

(22) Filed: Oct. 31, 2000

Related U.S. Application Data

(62) Division of application No. 09/182,910, filed on Oct. 30, 1998, now Pat. No. 6,381,374.

(51) Int. Cl.[7] ................................................. G06K 9/40
(52) U.S. Cl. ...................................... 382/275; 382/254
(58) Field of Search .............................. 382/254, 275, 382/270, 272; 358/463, 1.9; 348/241, 246

(56) References Cited

U.S. PATENT DOCUMENTS

| | | | | |
|---|---|---|---|---|
| 4,858,013 A | * | 8/1989 | Matsuda | 358/213.17 |
| 5,047,863 A | * | 9/1991 | Pape et al. | 358/213.16 |
| 5,617,461 A | * | 4/1997 | Schreiner | 378/98.5 |
| 5,790,694 A | * | 8/1998 | Maruo | 382/149 |
| 6,087,673 A | * | 7/2000 | Shishido et al. | 350/559.45 |

* cited by examiner

Primary Examiner—Thomas D. Lee
Assistant Examiner—Stephen Brinich
(74) Attorney, Agent, or Firm—Fletcher, Yoder & Van Someren

(57) ABSTRACT

A technique is disclosed for identifying potentially defective circuitry associated with discrete pixel regions in an imaging system detector. Signals representative of the pixels in an image matrix are generated. The signals are analyzed to identify mean and standard deviation values from a histogram of the pixel population. Pixels lying outside of a desired range, such as a distribution envelope determined from the histogram, are compared to the mean value plus or minus a multiple of the standard deviation. Pixels lying outside of the desired range are labeled or masked as potentially defective.

18 Claims, 4 Drawing Sheets

METHOD AND APPARATUS FOR DEFECTIVE PIXEL IDENTIFICATION

This application is a Divisional of application Ser. No. 09/182,910, filed Oct. 30, 1998 now U.S. Pat. No. 6,381,374.

TECHNICAL FIELD

The present invention relates to discrete pixel imaging systems, such as digital x-ray systems. More particularly, the invention relates to the identification of potentially defective circuitry in detection and signal processing components in such systems.

BACKGROUND ART

A number of techniques have been developed for producing images of an array of picture elements or pixels. Such systems typically include data acquisition circuitry which produces a series of signals representative of characteristics of pixels arranged in a matrix or array. For example, in a digital x-ray system, detector circuitry senses an amount of radiation impacting regions defining discrete pixels in a detector array. Based upon these radiation levels, the circuitry generates signals representative of each pixel, typically in the form of digitized intensity values. The values are transmitted to signal processing circuitry for filtering and enhancement. This circuitry may, for example, adjust the dynamic range of the detected values, and perform enhancement fimctions to emphasize or de-emphasize certain features of the image as defined by the pixel data. After processing, the data is stored for reconstruction of a composite image. In medical imaging systems, the composite image is useful to attending physicians and radiologists in diagnosis and treatment.

Detector circuitry in discrete pixel imaging systems is generally required to operate within specified tolerances. For example, in x-ray systems, circuitry associated with different pixels in the image matrix should produce output signals which are uniform for uniform levels of radiation received within the regions defined by the pixels. The uniformity provides accurate and repeatable image quality, permitting features in single images to be compared to one another, and images in a series to be similarly compared. However, some amount of deviation or tolerance is permitted between output signals for individual pixels to account for manufacturing differences, sensitivity differences, and so forth. Nevertheless, significant differences are generally not desirable between pixel circuitry output. Such differences can result in skewing of scaling of dynamic ranges, errors in image enhancement, production of anomalies or artifacts in the reconstructed image, and so forth.

Techniques have been developed for analyzing detector circuitry in discrete pixel imaging systems for potentially defective pixel circuits. In general, such techniques are implemented at final stages in the manufacture of the detectors or associated circuitry, or during calibration of the detector circuitry in the imaging system. Pixels identified as potentially defective may be flagged or masked in signal processing software. Thereafter, signals produced by the defective pixels may be disregarded or filtered separately from the non-defective pixel signals to reduce the likelihood of image processing errors or of unwanted artifacts.

While such techniques are useful in identifying potentially defective pixels, they are not always suitable for rapid reevaluation of discrete pixel detection systems after they are placed in service. Once a system is in service, it may be desirable periodically to perform a procedure for generating or updating a defective pixel mask or similar data used by the image processing circuitry. In particular, because detector circuitry can become defective after being placed in service, and thereby result in degradation of the image quality over time, it would be useful to provide a computationally efficient and straightforward technique for identifying potentially defective pixel circuits that could be implemented by operations personnel, clinicians or technicians. Pixels newly identified as potentially defective could then be flagged or added to a mask employed by image processing software. If an unacceptable degree of degradation is detected through the technique, the detector or associated circuitry may be replaced to once again provide the desired image quality.

DISCLOSURE OF THE INVENTION

The invention provides a technique for detecting potentially defective pixel circuits designed to respond to these needs. The technique may be employed in the evaluation of new detector circuitry, but is particularly well suited to analyzing existing circuitry already placed in service. Moreover, while the technique is particularly suitable for use in digital x-ray systems, it may find application in other imaging modalities wherein discrete pixel data are collected via detector circuitry wherein the output may vary from pixel-to-pixel within defined tolerances. The technique may be implemented in a straightforward procedure which is relatively time-efficient. Processing steps used to implement the technique may be programmed into existing imaging system controllers, further facilitating its use in existing systems. Pixels having output levels which differ in statistically significant ways from other pixels in the system are flagged and may be added to a map or mask used by image processing circuitry.

BEST MODE FOR CARRYING OUT THE INVENTION

Figure 1:
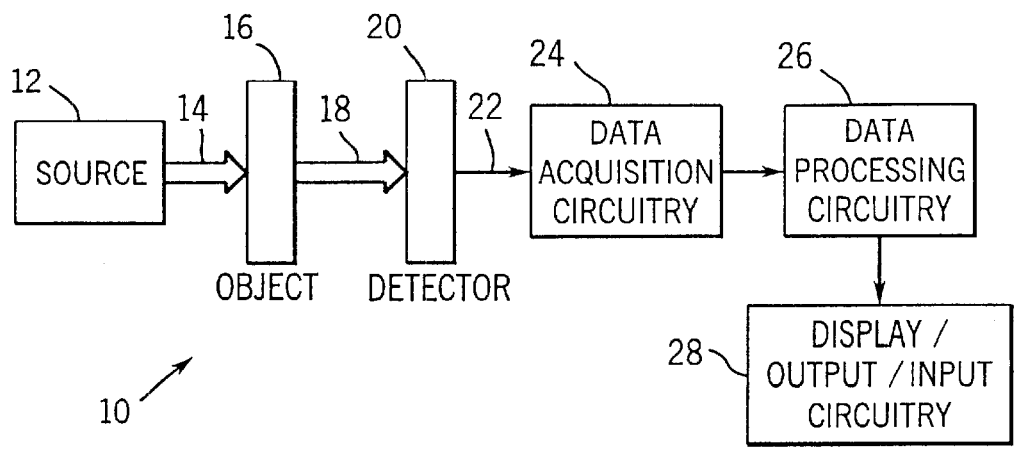
FIG. 1 is a diagrammatical representation of a discrete pixel imaging system in the form of a digital x-ray system.

Referring now to FIG. 1, an imaging system is illustrated and designated by the reference numeral 10. Imaging system 10 includes a controllable radiation source 12, such as a source of x-ray radiation, capable of emitting a controlled stream of radiation 14 upon demand. The stream of radiation contacts an object or subject of interest 16, such as a human body, when positioned in the path of the stream. A portion 18 of the radiation traverses the object and impacts a discrete pixel detector 20. Detector 20 encodes digital signals representative of the radiation received within discrete pixel regions, and outputs a data stream 22 representative of the digitized values. This stream of digitized data is received by data acquisition circuitry 24 and is further processed, such as to normalize the data, adjust dynamic ranges over which the data extends, and so forth. The processed signals from data acquisition circuitry 24 is then transmitted to data processing circuitry 26. Data processing circuitry 26 further filters the data to enhance the discrete pixel image defined by the data for storage and subsequent display. Data processing circuitry 26 is coupled to display/output/input circuitry 28 for receiving configuration parameters, such as via a keyboard, and for outputting reconstructed images based upon signals produced by detector 20 and filtered by circuitry 24 and 26.

It should be noted that while in the present discussion reference is made to an x-ray imaging system, the techniques described herein for identifying potentially defective regions in a discrete pixel detector may be applied to other imaging modalities as well. It should also be noted that in the embodiment described, data processing circuitry 26, including associated memory circuitry for storing control routines and processed data, is embodied in a general purpose or application-specific programmable digital computer. As will be appreciated by those skilled in the art, alternative embodiments may include application-specific microprocessors used in conjunction with appropriate memory circuitry, analogy circuitry, and combinations of analog and digital circuitry. Similarly, display/output/input circuitry 28 may include conventional operator keyboards, monitors, printers, and so forth.

Figure 2:
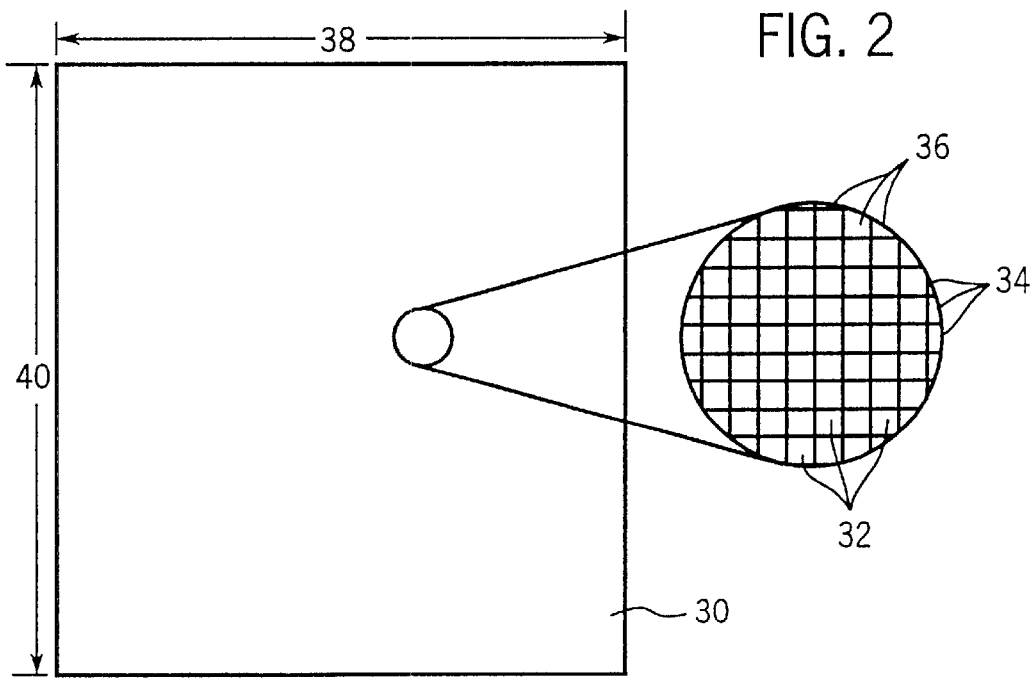
FIG. 2 is a plan view of an exemplary image matrix comprising a plurality of discrete pixels.

Detector 20 is configured with a detecting surface or face for producing discrete pixel signals forming a matrix of pixel locations as illustrated in FIG. 2. The discrete pixel matrix 30 comprises a plurality of pixel regions 32 arranged in adjacent rows 34 and columns 36. The rows and columns of pixels thus define an image matrix having a predetermined width 38 and height 40 measured as an integer multiple of the pixels comprising the matrix. For example, in x-ray applications matrix 30 may have pixel dimensions of 1,024×1,024 pixels. As will be appreciated by those skilled in the art, a variety of matrix dimensions may be employed, depending upon such factors as the subject to be imaged, the features of interest, and the resolution desired.

Figure 3:
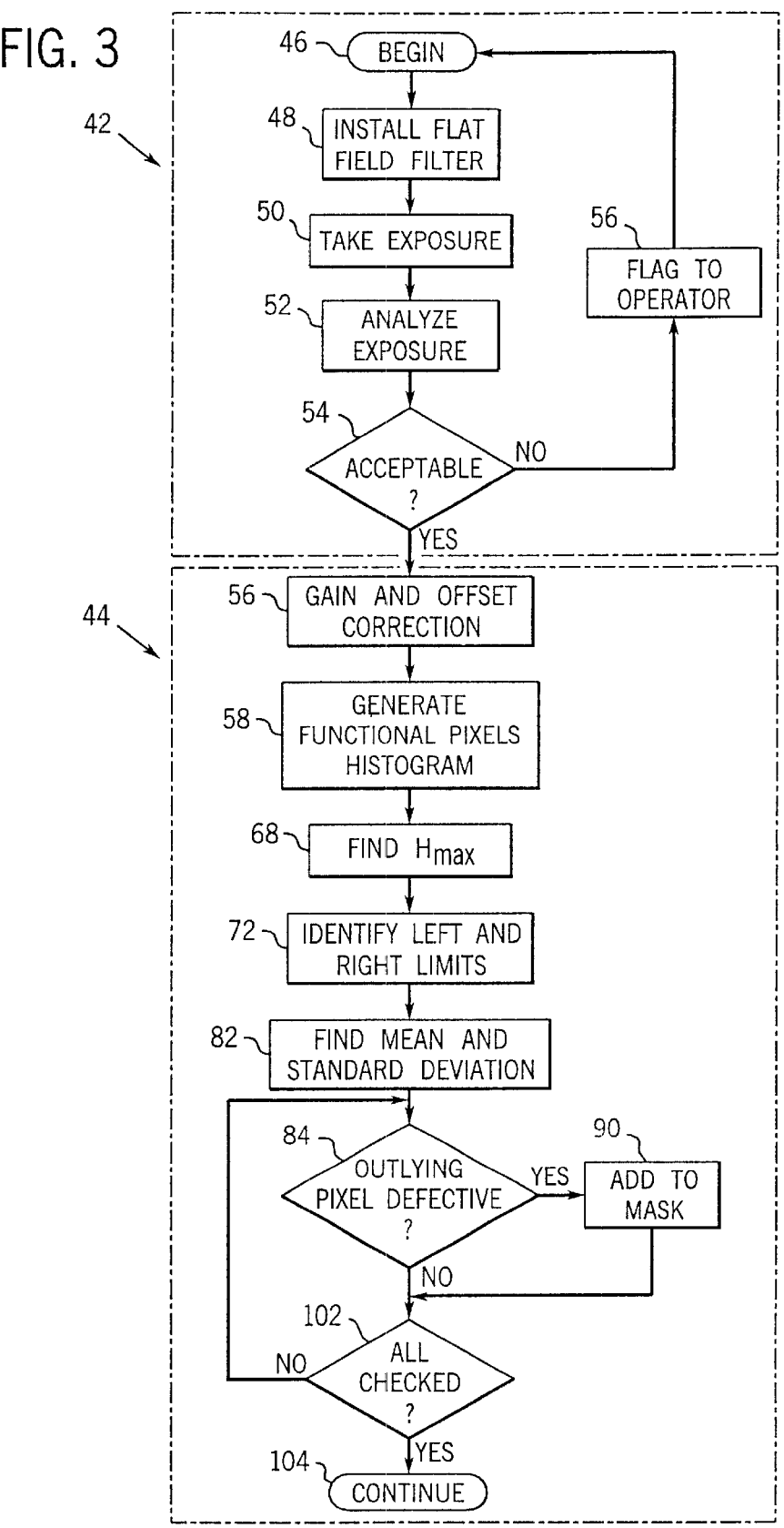
FIG. 3 is a flow chart illustrating steps in exemplary control logic for identifying potentially defective pixel circuitry in the system of FIG. 1.

In operation, signals encoded by detector 20 and processed by circuitry 24 and 26 are typically representative of intensity of radiation received within each discrete pixel region. However, specific pixel regions of detector 20, and associated circuitry contained within detector 20 may cause signals to be transmitted from the detector which are erroneous in nature. Specifically, such signals may indicate that the pixel region has received radiation above or below actual received levels, or has not received radiation although such radiation has impacted the region. In addition, regions of detector 20 may produce unreliable or inconsistent output signals. The presence of such erroneous signals in the acquired data may cause circuitry 24 and 26 to erroneously process the collection of pixel data defining the image, and therefore result in unsatisfactory final images. FIG. 3 represents steps in exemplary control logic for identifying such defective regions or associated circuitry.

Imaging system 10 is configured to analyze output from detector 20 and data acquisition circuitry 24 and to identify potentially defective pixel data circuitry. Such circuitry may be included in detector 20, or in data acquisition circuitry 24. In general, such defective circuitry may result in producing image data which is inconsistent with the actual amount or intensity of radiation received within associated pixel regions. As shown in FIG. 3, the control logic may be divided into two segments, including a data acquisition sequence 42, and a defective pixel identification sequence 44. Each sequence includes steps which, when implemented, would be embodied in code stored within memory circuitry associated with data processing circuitry 26. Data processing circuitry 26 executes the code upon prompting by an operator or technician via input circuitry 28.

Referring now to the steps of data acquisition sequence 42, the logic within this sequence begins at step 46 following prompting from the operator. At step 48, a flat field filter is installed between source 12 and detector 20. As will be appreciated by those skilled in the art, such flat field filters pass a narrow x-ray spectrum which will impact detector 20. While any suitable filter may be employed for this purpose, presently preferred filters include metallic screens, such as a one millimeter copper plate, or a two centimeter aluminum plate. To facilitate the data acquisition process, a fixture may be provided on source 12 or on detector 20 for supporting the filter. At step 50, an exposure is taken by emitting radiation from source 12, through the flat field filter, to impact detector 20. The particular settings employed during the exposure step will generally depend upon the configuration of the system being analyzed and the x-ray source tube capabilities. In general, the x-ray source may be set to the highest rated voltage setting for the source tube and to the highest mass setting permissible without saturation of the detector, to optimize the signal-to-noise ratio of the acquisition system.

Following the exposure at step 50, the pixel data produced during the exposure is analyzed as noted at step 52. In a present embodiment, this analysis includes calculation of a mean exposure in a central region of interest within the image matrix 30. For example, the mean exposure may be computed for a 124×124 pixel region in the center of a 2,048×2,048 pixel image matrix. This mean value is then compared to a desired range, such as a range of within 10 to 20 percent of the saturation level. If the analyses performed indicate that the exposure is acceptable for the purposes of the defective pixel identification sequence (i.e., within the range), the control logic proceeds to step 56 in FIG. 3. If, however, the exposure is found to be outside the range of acceptability, such as reaching a point of saturation of the detector, control returns to step 56 where the operator is notified of the need to repeat the exposure sequence.

Once acceptable exposure data is acquired through sequence 42, the data is evaluated through sequence 44 to identify potentially defective pixel data acquisition circuitry. Sequence 44 begins at step 56 where the data obtained at step 50 is gain and offset corrected. As will be appreciated by those skilled in the art, such corrections generally include subtraction from each pixel value of a fixed offset value for the detector system, and multiplication of the pixel data by a gain correction coefficient. Following such correction, a functional pixel histogram is generated as indicated at step 58.

Figure 4:
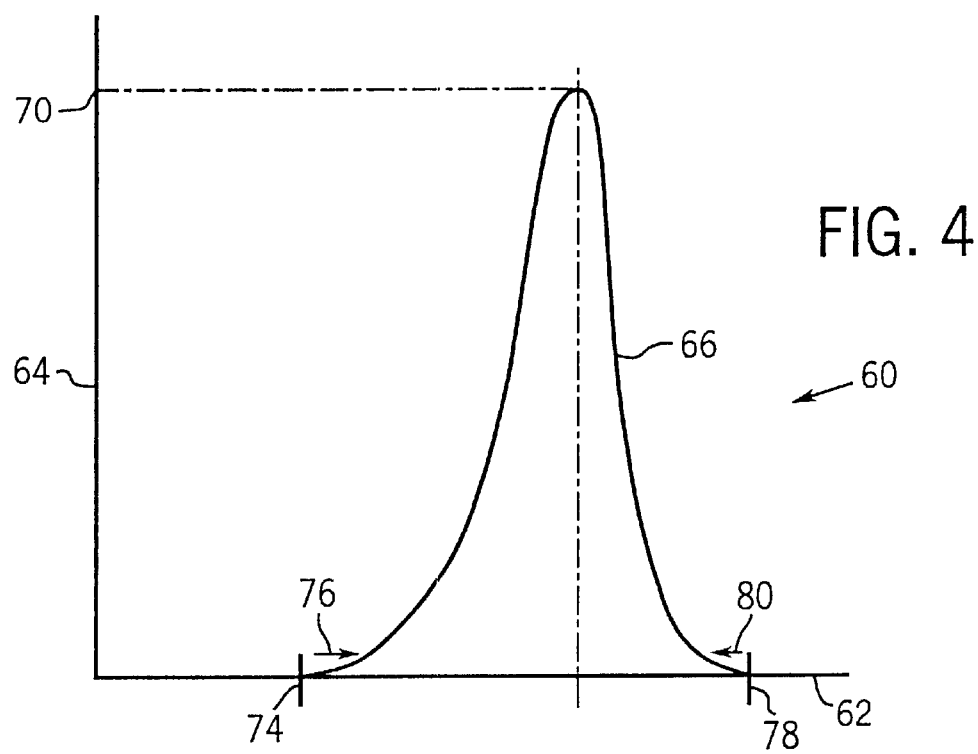
FIG. 4 is histogram of signal values generated by a discrete pixel detector arrangement in accordance with the steps of FIG. 3.

An exemplary histogram of this type is illustrated in FIG. 4. In general, the histogram, identified by reference numeral 60 in FIG. 4, represents populations or counts of pixels within matrix 30 having predetermined discrete intensity levels. Thus, histogram 60 maps the intensity levels along a horizontal axis 62, and the pixel counts or populations for each intensity level along a vertical axis 64. The histogram for the detector circuitry will generally define a step-wise curve 66 having a standard or Gaussian distribution. It should be noted that in the present embodiment, only pixels previously identified as functional are counted and analyzed in generating histogram 60 and through the analysis steps described below. Thus, where imaging system 10 has been previously calibrated or analyzed to detect potentially defective pixel circuitry, and such defective circuitry has been identified, a look-up table or mask identifying the pixels corresponding to the defective circuitry will generally have been established. Pixels defined by the mask as being associated with defective circuitry would not be analyzed in the subsequent steps. Of course, where appropriate, such pixel circuitry could be re-analyzed to verify its defective status. It should also be noted that while a graphical representation of the histogram 60 as illustrated and described herein, in practice, such histograms may be defined by memory contents associated with data processing circuitry 26. In general, such memory contents will include discrete intensity values, and pixel counts determined from analysis of the data resulting from exposure at step 50.

At step 68, a maximum population or count, denoted $H_{max}$, is identified from histogram 60. The value $H_{max}$ is identified by locating a maximum pixel count as indicated at reference numeral 70 in FIG. 4, and identifying the intensity value along axis 62 corresponding to the maximum count. Next, at step 72, left and right boundaries or limits are identified based upon the pixel histogram. In particular, as shown in FIG. 4, left and right or lower and upper boundaries 74 and 78 are identified at points at which histogram 60 reaches a pixel count of 0. The left and right limits are then derived from these boundaries. Thus, the left or lower limit is determined by moving from the left boundary 74 in an intensity-ascending direction as indicated by arrow 76 in FIG. 4, to the next incremental value along axis 62 as identified by reference numeral 77 in FIG. 5. Similarly, the right or upper limit value is derived from right boundary 78 by moving in an intensity-descending direction along axis 62 as indicated by reference numeral 80 in FIG. 4. The next lower intensity value, indicated by reference numeral 81 in FIG. 5, is identified as the right or upper limit.

At step 82, statistical parameters are calculated based upon the values between lower and upper boundaries 74 and 78. Specifically, the statistical mean $m_H$ and the standard deviation $\sigma_H$ are determined for the pixel population lying between the lower and upper boundaries. Based upon these statistical values, pixels lying outside of the primary distribution defined by the histogram are analyzed to determine whether they are acceptable or should be flagged as defective.

Thus, as indicated at step 84 in FIG. 3, all pixels lying to the left of boundary 74, or to the right of boundary 78 are analyzed to determine whether they are defective by searching for intensity levels lying to the left of lower limit 77 or to the right of upper limit 81, and having non-zero population counts.

Figure 5:
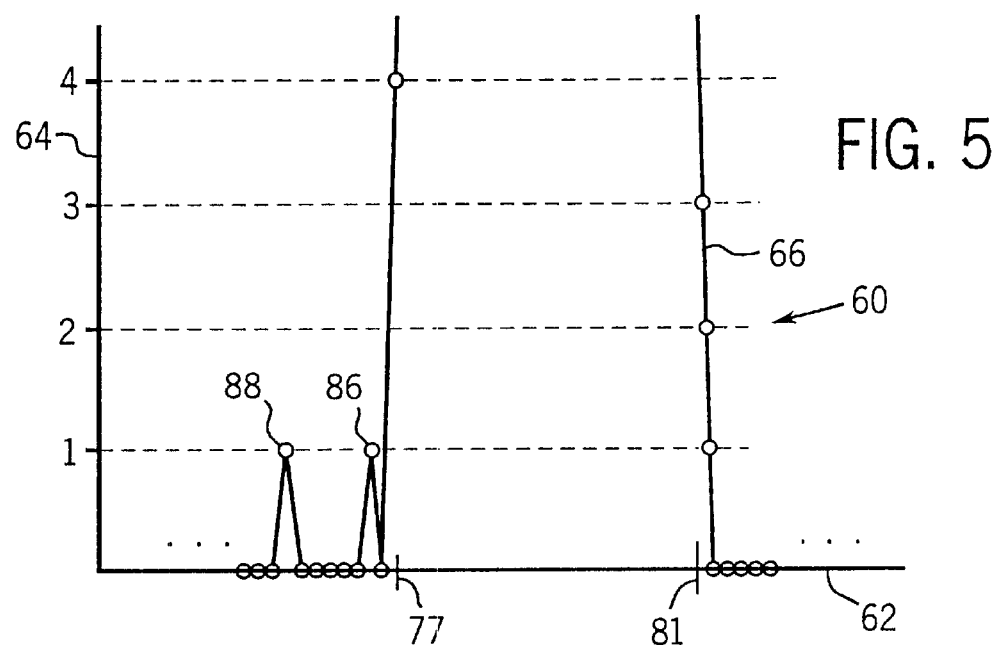
FIG. 5 is a detail view of a histogram of the type shown in FIG. 4 illustrating the identification of potentially defective pixels in a discrete pixel detector arrangement.

In the embodiment illustrated in FIG. 5, such pixels include pixels at intensities 86 and 88 lying to the left of lower limit 77. When such pixels are found, their intensity value is compared to a value derived from the mean and standard deviation values. Specifically, for pixels having intensity values less than lower limit 77, a comparison is performed at step 84 which may be expressed by the following relationship:

$$I_b < m_H - \sigma_H \alpha$$

where $I_b$ is the intensity value for the outlying pixel, $m_H$ is the mean value determined at step 82, $\sigma_H$ is the standard deviation value determined at step 82, and $\alpha$ is an allowable multiple of the standard deviation. Any suitable value for a may be employed in this process, including non-integer values, depending upon the tolerance desired and the precision of the detector circuitry. For example, in a present embodiment, a value of 7 is employed.

Where pixels lying to the right of upper limit 81 are identified for analysis at step 84, a similar comparison is performed. Specifically, the intensity value for the outlying pixel is compared to a value derived from the mean and standard deviation values as follows:

$$I_b > m_H + \alpha \sigma_H$$

where the defined parameters have the same values as those described above. It should be noted, however, that the value for $\alpha$ employed in the analysis of higher-intensity pixels may be different from that employed for the lower-intensity pixels.

If the analysis performed at step 84 indicates that the intensity of an outlying pixel lies outside the acceptable range, the pixel circuitry is identified as potentially defective, and a value corresponding to the pixel address is added to a defective pixel mask at step 90. In general, the defective pixel mask will include values corresponding to the addresses of defective pixel circuitry, and will be stored in memory circuitry associated with data processing circuitry 26. The mask may be used by data processing circuitry 26 in subsequent processing to filter the defective pixel information in a different way, or to disregard the information all together. Moreover, the mask of defective pixel circuitry may be used as a basis for indicating that a detector or associated circuitry requires replacement or servicing.

Figure 6:
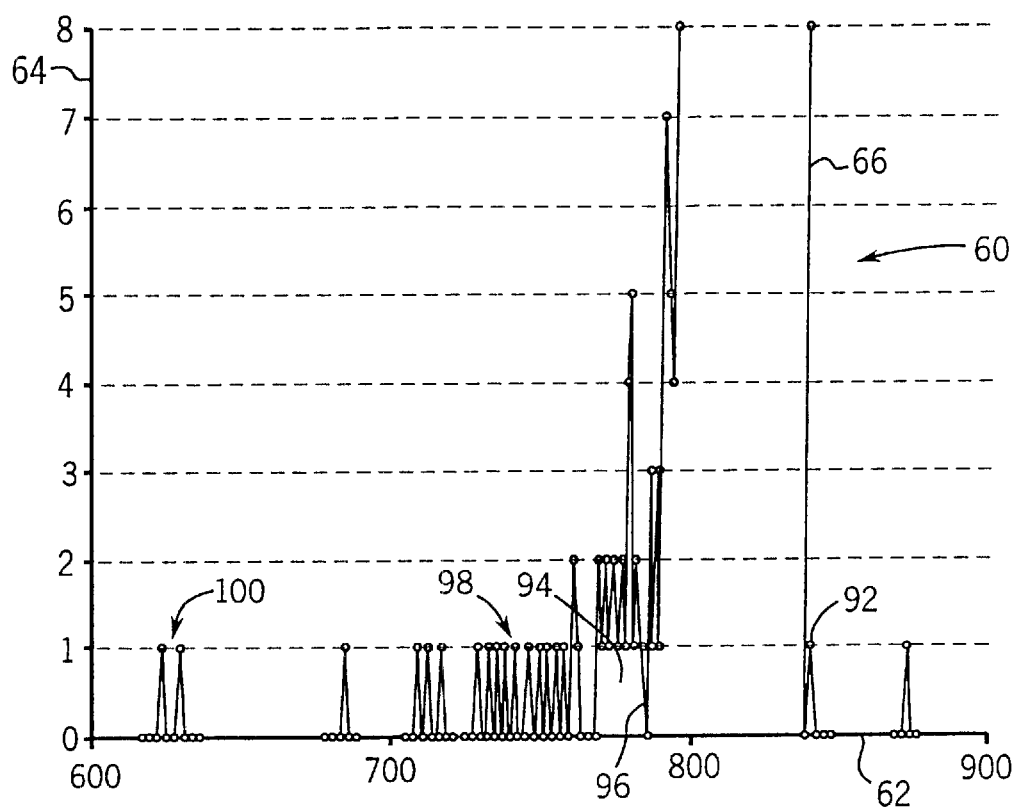
FIG. 6 is a detail view of another histogram of the type shown in FIG. 4, also illustrating the identification of potentially defective pixels.

It should be noted that the defective pixel identification sequence 44 permits pixels lying outside a primary envelope of the detector histogram to be maintained in a definition of functional pixels. FIG. 6 illustrates an exemplary histogram wherein a number of pixels lie outside the histogram curve, some of which may be identified as defective while others may nevertheless be counted as functional. Specifically, in the histogram of FIG. 6, a first outlying pixel 92 has an intensity value greater than that of the upper boundary for the histogram, but which may, nevertheless, be acceptable for imaging purposes. Similarly, a group of pixels, as indicated by reference numeral 94, lies to the left of the primary envelope of the histogram, separated therefrom by an intensity value 96 having a population count of 0. However, the group of pixels 94 may nevertheless provide important imaging information, and may therefore be considered functional in the foregoing analysis.

A second group of pixels 98 lies further to the left of group 94, and may include pixels which are considered functional or defective, depending upon their relative intensity values and upon the envelope defined by the comparisons set forth above. Finally, a third group of pixels 100 lies far to the left of the preceding groups and would be expected to lie outside the range of acceptability.

If an outlying pixel is identified as acceptable or functional at step 84, the identification sequence proceeds to step 102 where a search is performed for additional pixels having intensities lying to the left or to the right of the lower and upper limit values. If such pixels are found, the comparison of step 84 is repeated for such outlying pixels. This logic continues until all outlying pixels are analyzed and all pixels satisfying the relationships identified above have been identified and added to the mask at step 90. Once all outlying pixels have been analyzed, the routine returns or continues as indicated at step 104.

As will be appreciated by those skilled in the art, the foregoing technique offers a computationally efficient method for identifying potentially defective pixel circuitry in an imaging system. For example, in the present embodiment described above, only a small minority of the total pixel population need be evaluated as potentially defective. All other pixels lying within the primary envelope of the histogram distribution curve need not be evaluated by the desired envelope comparison. Moreover, the technique offers a straight forward implementation which may be loaded and executed in existing systems and performed on a periodic basis by operations personnel in a test or verification program. The technique may thereby supplement earlier or concurrent verification routines used to adjust data collected by the imaging system or to provide notice of the need to service or replace system components.

What is claimed is:

1. A method for identifying defective pixel circuits in a discrete pixel imaging system, the method comprising the steps of:

(a) analyzing pixel data representative of functional pixel circuits in the system to identify a desired population;

(b) identifying pixel circuits outside the desired population as potentially defective pixel circuits;

(c) computing mean and standard deviation values for the desired population and reference values based upon the mean and standard deviation values; and (d) comparing pixel data for the potentially defective pixel circuits to reference values to identify defective pixel circuits.

2. The method of claim 1, wherein desired population is identified by identifying pixel circuits having data values below a lower threshold value or above an upper threshold value.

3. The method of claim 2, wherein the lower and upper threshold values are determined by identifying pixel intensity values having pixel populations below a desired count.

4. The method of claim 1, wherein a lower reference value is computed by subtracting a first multiple of the standard deviation value from the mean value, and an upper threshold value is computed by adding a second multiple of the standard deviation value to the mean value.

5. The method of claim 4, wherein at least one of the first and the second multiples is not an integer multiple.

6. The method of claim 4, wherein the first multiple is equal to the second multiple.

7. The method of claim 1, wherein the pixel data is representative of a level of radiation impacting regions of a detector defining each functional pixel.

8. An imaging system adapted to identify defective pixel circuits, the system comprising:

a data acquisition subsystem including a detector circuit for generating pixel data representative of pixels in an image matrix, a source of radiation, a radiation detector for receiving radiation from the source and for generating the pixel data based upon a parameter of the received radiation;

a pixel data analyzing circuit coupled to the data acquisition subsystem and configured to identify a desired population of pixels from the pixel data and to compute statistical characteristics of the desired population;

a comparison circuit coupled to the analyzing circuit and configured to compare pixel data to reference values derived from the statistical characteristics to identify defective pixel circuits; and a flat field filter configured to be placed between the source of radiation and the radiation detector during generation of the pixel data.

9. The system of claim 8, further including a memory circuit coupled to the comparison circuit and configured to store values representative of defective pixels identified by the comparison circuit.

10. The system of claim 8, wherein the analyzing circuit and the comparison circuit are defined by programming code in a programmable signal processor.

11. An imaging system adapted to identify defective pixel circuits, the system comprising:

a data acquisition subsystem including a detector circuit for generating pixel data representative of pixels in an image matrix;

a pixel data analyzing circuit coupled to the data acquisition subsystem and configured to identify a desired population of pixels from the pixel data and to compute statistical characteristics of the desired population, wherein the analyzing circuit is configured to compute mean and standard deviation values for the desired population and to derive the reference values from the mean and standard deviation values; and a comparison circuit coupled to the analyzing circuit and configured to compare pixel data to reference values derived from the statistical characteristics to identify defective pixel circuits.

12. The system of claim 11, wherein the data acquisition subsystem includes a source of radiation and a radiation detector for receiving radiation from the source and for generating the pixel data based upon a parameter of the received radiation.

13. The system of claim 11, further including a memory circuit coupled to the comparison circuit and configured to store values representative of defective pixels identified by the comparison circuit.

14. The system of claim 11, wherein the analyzing circuit and the comparison circuit are defined by programming code in a programmable signal processor.

15. An imaging system adapted to identify defective pixel circuits, the system comprising:

a data acquisition subsystem including a detector circuit for generating pixel data representative of pixels in an image matrix;

a pixel data analyzing circuit coupled to the data acquisition subsystem and configured to identify a desired population of pixels from the pixel data and to compute statistical characteristics of the desired population; and a comparison circuit coupled to the analyzing circuit and configured to compare pixel data to reference values derived from the statistical characteristics to identify defective pixel circuits., wherein the comparison circuit is configured to compare only pixels outside the desired population to the reference values.

16. The system of claim 15, wherein the data acquisition subsystem includes a source of radiation and a radiation detector for receiving radiation from the source and for generating the pixel data based upon a parameter of the received radiation.

17. The system of claim 15, further including a memory circuit coupled to the comparison circuit and configured to store values representative of defective pixels identified by the comparison circuit.

18. The system of claim 15, wherein the analyzing circuit and the comparison circuit are defined by programming code in a programmable signal processor.

* * * * *